United States Patent [19]

Horrocks et al.

[11] 4,001,445
[45] Jan. 4, 1977

[54] PRESERVED MEAT

[75] Inventors: Derek Horrocks, Knossington; Keith Buckley; Alan John Vernon, both of Melton Mowbray, all of England

[73] Assignee: Pedigree Petfoods Limited, Melton Mowbray, England

[22] Filed: May 7, 1973

[21] Appl. No.: 357,598

[30] Foreign Application Priority Data

May 11, 1972 United Kingdom ............ 22196/72

[52] U.S. Cl. ............................. 426/250; 426/289; 426/326; 426/332; 426/335; 426/641; 426/643; 426/656

[51] Int. Cl.$^2$ ...................... A23B 4/14; A23L 3/34

[58] Field of Search .......... 426/151, 212, 213, 227, 426/326, 332, 335, 324, 805, 250, 289, 292, 294, 295, 272, 327, 532, 641, 643, 656

[56] References Cited

UNITED STATES PATENTS

| | | | |
|---|---|---|---|
| 3,075,843 | 1/1963 | Maas et al. | 426/272 |
| 3,595,681 | 7/1971 | Kaplow et al. | 426/324 |
| 3,615,727 | 10/1971 | Starke | 426/324 X |
| 3,694,233 | 9/1972 | Kaplow et al. | 426/212 X |

FOREIGN PATENTS OR APPLICATIONS 1,231,110   5/1971   United Kingdom

*Primary Examiner*—Raymond N. Jones
*Assistant Examiner*—R. A. Yoncoskie
*Attorney, Agent, or Firm*—Davis, Hoxie, Faithfull & Hapgood

[57] ABSTRACT

Uncooked meat or simulated meat is preserved, while retaining its substantially raw appearance and characteristics, by infusion with sufficient edible water soluble solute to stabilize it against microbiological spoilage and packing the infused material in the absence of oxygen, for example, under an inert gas or a vacuum. The meat or other animal tissue may be treated to inhibit enzyme activity without cooking or denaturing the protein, especially in the case of meat products of high enzyme activity. Infusion can be carried out at low temperature, for example −20° to −5° C, but preferably at 15° to 40° C for a period of 4 to 6 hours. Alternatively, the raw starting material can be sealed in a package with an aqueous solution of sufficient solute, infusion then taking place within the sealed package. A protein sweetmeat for pet animals can be prepared by infusion meat pieces with sugar and thereafter dusting the pieces with solid sugar. Apart from the provision of preserved protein as food the invention can be employed for the transport of meat where refrigeration facilities are not available. It can also be used for the preservation of anatomical specimens.

5 Claims, No Drawings

PRESERVED MEAT

The present invention relates to the preparation from raw natural meats, meat offals or fish of a product which retains as far as possible the same colour, appearance and texture as the original meat material but has a prolonged shelf life. It is further intended to provide a product that is acceptable to domestic pets.

Hitherto, materials such as raw meats have either had a very short shelf life or, when preserved by such means as dehydration, have had poor animal acceptance.

It has now been found in accordance with this invention that meat material such as raw meats, meat offals and fish, or meat-like protein products can be preserved for long periods by infusing into the material sufficient edible water-soluble solute, for example a polyhydric alcohol, sugar or salt, to stabilise the material against microbiological spoilage more especially by producing a water activity (Aw) of less than 0.85, and packing the infused material substantially in the absence of oxygen. In this way preserved meats with a desirable uncooked, raw appearance can be obtained and, moreover, the high losses in product weight associated with cooking are avoided.

Certain meats such as liver have a high initial level of enzyme activity which can lead to breakdown of the product on storage. Such meats may be treated to reduce the activity of or completely inactivate the enzymes present without exerting a cooking or denaturing effect on the meat. With other meats which possess relatively low levels of enzyme activity, such as horsemeat, it has not been found necessary to employ additional inhibitory treatment to preserve the meat over a shelf life of 6–12 months.

In meats where a satisfactory low level of enzyme activity has not been achieved in the preserved condition, two major defects may arise on storage which may be recognised as (i) a separation of specks of free fatty acids on the meat surface, and (ii) a softening and breakdown of the meat tissue with consequent syneresis.

However, a limited degree of meat tissue softening by proteolysis may be tolerated in products to be fed to pet animals, and in particular for those intended as cat food, since felines prefer meat with a tender texture, providing that the meat product chunks retain a discrete, coherent identity. Similarly, the conversion of fats present in the meat tissues into the free fatty acid by lipolysis may be tolerated, and in particular for materials intended as cat food since felines prefer meats of high acid content, providing that the free fatty acids or fractions of these do not separate and show up as white spots on the meat surface, thereby detracting from the appearance of the product.

Additionally, with certain meats such as liver, faint aromas like that of hydrolysed vegetable protein may develop towards the end of the product's shelf life due to Maillard type browning reactions. Such aroma developments may be advantageous since both cats and dogs have a marked preference for hydrolysed protein aromas, but in meats such as lung it has been found that faint undesirable aromas are produced which resemble fenugreek and in cases such as this the inclusion of sodium metabisulphite in the diffusing liquid can reduce the adverse effects from these reactions.

The materials which can be preserved by this method include raw meats, meat offals, fowl and fish. The meats may include meat by-products such as blood, skin and bone. The preferred material is red muscle meat, e.g. horsemeat. Preserved vegetables and fruits may be added to the product.

The meats may be infused by soaking them in a solution or dispersion of the solutes. The dispersion may comprise polyhydric alcohols such as glycerol, propylene glycol or mixtures of such alcohols prepared in the manner described in U.S. Pat. Nos. 2,282,603; 2,201,235 and 2,290,439; and optionally also salts such as sodium and calcium chloride, sugars such as sucrose, glucose and starch hydrolysates, antioxidants such as butylated hydroxylanisole, antimycotics such as potassium sorbate, and flavouring agents.

Any edible, water-soluble or dispersible compound which can permeate the meat tissue may be included in the stabilising dispersion whether it be of small or high molecular weight i.e. The method can be used to preserve meats not only in a form for consumption, but also for transport, especially in regions where refrigeration facilities are not available. The meaty materials preservable by this invention include not only meats intended for ultimate consumption, but also animal tissues for other purposes, for example as anatomical specimens (including human tissues), whether it has a significant effect on wateractivity in solution or not, since the prime purpose of the dispersion is to replace the water in the meat tissue with a non-aqueous material. In the case where high polymers of good water solubility e.g. gelatine or dextrins are used to reduce water content, the water activity of the remaining aqueous phase will still be high but, since the total quantity of this phase is small, only small quantities of low molecular weight compounds, such as salt, need be introduced to bring down the water activity to a satisfactory level.

The inclusion of antimycotics may be avoided if ionising radiation is used on the product sealed into containers to eliminate fungal organisms.

Any method of soaking the meat pieces with the stabilising solution or dispersion may be used. The preferred method is to immerse the meat pieces in an agitated tank of the liquid for the required time, although a continuous method such as passing the meats and the liquid through a mixing and conveying machine may be used. The meat may be passed through a series of tanks containing solutions of progressively increasing concentrations of solutes so as to produce a more uniform and gradual stabilisation.

Stitch or vascular pumping may be used to introduce the stabilising solution. It is not necessary that the meat pieces, when packed for example into plastic pouches, have a uniform water activity throughout each piece since further equilibration to an average water activity occurs in the pouch. It is preferred, but not essential, that the packets of meat pieces be kept at a low temperature, say 0°–10° C, for the first 24 hours after manufacture so as to minimise the possibility of bacterial growth until equilibration of the stabilising solution within the meat piece has occurred.

It is desirable that the preserved meat pieces be packed under an inert gas, such as nitrogen or carbon dioxide or under a vacuum.

The stabilisation process may be carried out over the temperature range of −20° C to +40° C.

The stabilisation time is related inter alia to the thickness of the meat tissue. At the preferred thickness of 0.5 inch for non-tenderised muscle meat the stabilisation time is 24 hours at room temperature. The thickness preferably ranges from 0.1 to 1 inch and the stabilisation time from five minutes to seven days. Where stitch or vascular pumping is used to introduce the stabilising solution, pieces of meat thicker than 1 inch may be used.

The stabilisation process can most simply be carried out by immersing half-inch thick pieces of meat, which preferably have been passed through a mechanical steak tenderising machine or similar meat penetration device, in a solution or dispersion of the stabilising solutes such as sugar and glycerol at temperatures between −5° C and 40° C for several hours and gently mixed from time to time. The meat pieces are removed when the water activity has attained a satisfactory level and packed in suitable containers from which air is preferably excluded.

Although the diffusion process occurs more rapidly at elevated temperatures it is often preferable to carry out the process over a longer period at refrigeration temperatures, especially from −20° to −5° C, in order to avoid the possibility of bacterial growth during the period of diffusion. The use of such low temperatures is particularly desirable in treating meats such as liver or heart, which because of their structure are difficult to penetrate and therefore require longer periods of treatment. At room temperature or above the necessary prolonged treatment (which may be of the order of days) carries with it an increased risk of bacterial growth before stabilization is complete.

In an alternative technique the raw meat pieces, without a preliminary soak, are placed along with the stabilising solution in a plastic pouch or other suitable packaging container so that equilibration occurs within the sealed package. In this case the stabilising solution may also contain hydrophilic gums, colouring or flavouring agents added either directly or in the form of microencapsulated granules so that when the product is prepared for consumption by cooking it in water, a thickened, flavoured and coloured gravy is obtained to complement the cooked meat.

In the preferred practice of the invention, pieces of fibrous meat such as horsemeat, whalemeat or fish, preferably 1 × 1 × ½ inch dimensions and which may have been passed through a mechanical tenderiser, are immersed in a solution of sugars and polyhydric alcohols, salts such as sodium chloride, antimycotics such as potassium sorbate, in the ratio of 40 parts of meat to 160 parts of stabilising solution. The solution temperature is maintained at 15° − 40° C and the meat pieces are agitated continuously within the solution over a period of 4 to 6 hours, or until diffusion of the stabilising materials into the meat reduces the water activity of the meat to 0.75 − 0.85.

The meat pieces are removed from the dispersion, drained and heat-sealed into clear plastic pouches of very low gas and water vapour transmission properties under an inert gas such as nitrogen or under a vacuum. The packaged product is preferably held at a low temperature, for example 1°−10° C, over the first 24 hours after manufacture.

With many fibrous meats such as horsemeat and with materials such as lungs the enzyme activity level is so low that the inhibition created by the low water activity level, low dielectric constant of the aqueous phase, the type of solute present and the anaerobic atmosphere is sufficient to ensure that gross defects due to enzymic degradation do not occur within the normal shelf life of 6–12 months. In addition, the prolonged soaking in solutions of high sucrose and glycerol content reduce the meat enzyme activity by dissolving out large quantities of enzymes from the meat tissue. It is desirable that complete penetration of the meat tissues be obtained within a reasonable length of time, say 48 hours, in order to stabilise the bacterial and enzyme activity, and mechanical tenderisation is of considerable assistance with difficult meats such as pigs maws. Similarly, tumbling of the raw meat pieces in a slurry of glycerol and sugar using for example a concrete mixer, is found to markedly assist the rate of penetration of solutes into the meat.

Sodium nitrite or such compounds as nitric oxide or imidazole may be used, with a nitrogen atmosphere, to maintain a bright pink colour in red meats and pink colour in the blood. However, it has been unexpectedly found that the use of a nitrogen atmosphere alone maintains a satisfactory raw meat appearance in preserved "raw" meats of low water activity. The small quantity of blood-like liquid which drains from the meat over the first day after manufacture adds to the natural raw meat appearance of the product and it has been found that this blood is absorbed into the meat during the first 2 months after manufacture.

Confirmation that the meat has a low enzyme activity level can be obtained by placing packets of the diffused product in an incubator at 37° C for 2 weeks, when large increases in free fatty acid content and total volatile base content together with a large decrease in pH value indicates an undesirably high enzyme level. The proteolytic enzyme activity of the meat can also be determined using a radioactive labelled subtrated $C^{14}$ haemoglobin. The free amino acids (labelled with $C^{14}$) produced by the enzyme attack can be separated from the denatured haemoglobin, and an aliquot incorporated into a liquid scintillator and counted see Roth, Losty and Wierbicki — Analytical Biochemistry, 42, 214 −22, 1971).

However, meat offals such as liver and pigs maws often possess a high level of enzyme activity and it is possible to significantly reduce this by a number of methods which do not affect the natural raw meat appearance and texture, unlike the normal cooking methods of enzyme deactivation which cause significant changes in the meat texture, colour and appearance. These techniques include the use of alcohol, E.D.T.A., sulphites or sulphur dioxide, pH adjustment, the use of gases such as Co, $CO_2$, NO or $N_2$ under normal or high pressures, or the application of microwaves so as to obtain a reduction in enzyme activity without causing significant denaturation of the meat proteins.

However, in certain instances even a mild preparation treatment such as that applied during the hot scrub-cleaning treatment of pigs maws has, coupled with the removal of glands such as the pancreas, produced a sufficient reduction in enzyme activity to avoid gross defects showing up in the preserved product on storage.

In accordance with a more specialized aspect of this invention, it has also been found that by immersing meats in a stabilising solution containing a major proportion of sucrose, thoroughly draining to remove excess stabilising dispersion and dusting with sugar, an attractive and stable treat for domestic pets can be introduced.

The following are examples which illustrate how the invention may be put into practice. All parts and percentages are quoted by weight.

EXAMPLE 1

Forty parts of horsemeat which had been cut into pieces of 1 × 1 × ½ inch dimensions were immersed in 160 parts of a stabilising dispersion at 20° C and continuously agitated over a period of 24 hours. The dispersion had the following composition:

| | |
|---|---|
| Sucrose | 56% |
| Water | 14% |
| Glycerol | 29% |
| 2% Sodium Nitrite Solution | 0.4% |
| Potassium Sorbate | 0.4% |
| Butylated Hydroxyanisole | 0.01% |

At the end of this period the meat pieces were removed, drained and heat-sealed into Saran coated polyethylene pouches under an atmosphere of nitrogen. The product had the bright red appearance and texture of fresh horsemeat and it had a water activity of 0.80 and a moisture content of 30%.

Even after storage at room temperature for 6 months the product maintained its fresh meat appearance and texture. No significant change occurred during this period except that the small quantity of blood-like liquid initially present was absorbed by the meat at an early stage.

EXAMPLE 2

Fifty parts of horsemeat, in cubes of approximately 1 inch dimensions, were placed in a churn containing 50 parts of a stabilising solution in such a way that the churn was filled and the churn was then closed. During the first 24 hours the churn was rolled around intermittently to promote mixing.

The stabilising dispersion had the following composition:

| | |
|---|---|
| Propylene Glycol | 9.0% |
| Glycerol | 83.0% |
| Salt | 6.0% |
| Potassium Sorbate | 1.0% |
| 2% Sodium Nitrite Solution | 1.0% |
| Butylated Hydroxyanisole | 0.01% |

The water activity of the meat was found to have decreased to the bacteriostatically satisfactory level of 0.80 within the first 24 hours residence time. As a storage test the product was maintained at 38° C within the churn for a period of 3 months.

The preserved meats, after separation from the dispersion, could be used in commercial canned pet food to replace up to 25% of the normal meat content or after passing through a washing tank as a complete replacement for the normal meat content.

EXAMPLE 3

This was performed as in Example 2 except that the following stabilising dispersion was employed in the ratio of 45 parts dispersion to 55 parts of meat:

| | |
|---|---|
| Calcium Chloride Hexahydrate | 79.2% |
| Water | 13.8% |
| 2% Sodium Nitrite Solution | 1.0% |
| Propylene Glycol | 6.0% |
| Butylated Hydroxyanisole | 0.01% |

The preserved meat was thoroughly washed to reduce its calcium content before use in manufacturing canned pet foods.

EXAMPLE 4

Fifty parts of horsemeat, in pieces of 1 × 1 × ½ inch dimensions, were immersed in 50 part of a stabilising dispersion at 37° C for a period of 4 hours. The dispersion had the following composition:

| | |
|---|---|
| Propylene Glycol | 9.0% |
| Glycerol | 79.0% |
| Salt | 10.0% |
| Potassium Sorbate | 1.0% |
| Butylated Hydroxyanisole | 0.01% |
| Sodium Metabisulphite | 0.23% |

The meat was drained and packed into plastic pouches under an atmosphere of nitrogen. The initially pale red-brown colour of the meat gradually became redder over a 6 month storage period at room temperature and the product did not possess the meat extract-type aromas associated with non-enzymic browning reactions. Its colour also seemed to be less sensitive to the presence of oxygen in the storage atmosphere than did meats cured with nitrite.

EXAMPLE 5

Entire lobes of pig lungs were passed through a steak tenderising machine and then the ½ inch thick pieces were diced into 2 inch squares. Fifty parts of the meat pieces were immersed in 200 parts of a stabilising solution at room temperature for four hours. The meat pieces were then removed, drained and packed using a "Multivac" packaging machine which creates a vacuum in the sample chamber before introducing an inert gas such as nitrogen. When an elastic, aerated textured material such as lung is evacuated, the material expands to double its original size and then returns to its normal size on the introduction of nitrogen. This process of swelling and contraction markedly assists the penetration of the solutes into the lung tissue.

The stabilising dispersion employed was:

| | |
|---|---|
| Sucrose | 56.0% |
| Water | 14.0% |
| Glycerol | 25.0% |
| 2% Sodium Nitrite Solution | 0.4% |
| Potassium Sorbate | 0.4% |
| Butylated Hydroxyanisole | 0.01% |
| Propylene Glycol | 4.0% |

The stabilised lungs had a water activity of 0.78, possessed a bright red colour and had an appearance similar to that of raw fibrous meat.

EXAMPLE 6

Fifty parts of horsemeat in pieces of 1 × 1 × ½ inch were immersed and agitated in 50 parts of a stabilising dispersion for four hours at 37° C. The dispersion had the following composition:

| | |
|---|---|
| Propylene Glycol | 9.0% |
| Glycerol | 79.0% |
| Salt | 10.0% |
| Potassium Sorbate | 1.0% |
| 2% Sodium Nitrite Solution | 1.0% |
| Butylated Hydroxyanisole | 0.01% |

The meat pieces were cooled, drained and packed under nitrogen into polyethylene pouches.

On storage at room temperature over a nine-month period the following analytical data were recorded:

| | Initial | 3 months | 9 months |
|---|---|---|---|
| % Free Fatty Acids | 1.4 | 8.1 | 12.3 |
| % Total Volatile Base | 7.6 | 18.2 | 18.0 |
| pH | 5.8 | 6.2 | 6.1 |

These values support the subjective impression that no significant enzymolysis had occurred during the storage period.

Bacteriological analysis of the samples over the nine-month period produced the following results:

| | Initial | 4 days | 7 days | 28 days | 6 months | 9 months |
|---|---|---|---|---|---|---|
| Aerobic organisms per g. | 16,000 | 7,000 | 8,500 | 1,000 | 100 | 100 |
| Anaerobic organisms per g. | — | 43 | — | 23 | Nil | — |

EXAMPLE 7

Fifty parts of liver in slices of ½ inch thickness were immersed and agitated in 200 parts of a stabilising dispersion at 0° to −4° C and held at this temperature for 4 days. The dispersion had the following composition:

| | |
|---|---|
| Sucrose | 50.0% |
| Water | 16.0% |
| Glycerol | 28.5% |
| 2% Sodium Nitrite Solution | 0.45% |
| Potassium Sorbate | 0.45% |
| Butylated Hydroxyanisole | 0.01% |
| Propylene Glycol | 4.5% |

At the end of the stabilisation period the solution temperature was raised to 20° C and the meat pieces were removed, drained and packed under nitrogen in Saran-coated polyethylene pouches.

The stabilised product had the typical colour, appearance and texture of raw liver.

EXAMPLE 8

Thirty-three parts of mechanically tenderised pigs maws, 33 parts of pigs lungs and 34 parts of whalemeat, each of dimensions 1 × 1 × ½ inch, were placed in a rotating drum with 150 parts of a stabilising solution and the mixture was tumbled at 20° C over a period of 3 hours. The meat pieces were separated from the thin syrup which had formed, drained and packed under nitrogen in Saran-coated polyethylene pouches.

The stabilising dispersion had the following formulation:

| | |
|---|---|
| Sucrose | 66.0% |
| Glycerol | 33.0% |
| Potassium Sorbate | 0.5% |
| 2% Sodium Nitrite Solution | 0.5% |
| Butylated Hydroxyanisole | 0.01% |

The meat had a water activity of 0.81 and had a good fresh raw meat appearance.

EXAMPLE 9

Forty parts of mechanically tenderised pigs maws which had been hot-scrubbed clean and cut into 1 × 1 × ½ inch dimensions were immersed in 100 parts of a stabilising dispersion at 40° C and continuously agitated for 4 hours.

The dispersion had the following composition:

| | |
|---|---|
| Sucrose | 56% |
| Water | 14.3% |
| Glycerol | 25% |
| Propylene Glycol | 4% |
| Potassium Sorbate | 0.6% |

At the end of this period, the meat pieces were removed, drained and heat sealed into Saran-coated polyethylene pouches under an atmosphere of nitrogen. The product had a pink appearance and fresh texture with a water activity of 0.80.

EXAMPLE 10

The following is an example of the production of a "meat treat" for pet animals. 20 parts of horsemeat which had been cut into 1 × 1 × ½ inch dimensions were immersed in 110 parts of stabilising dispersion and continuously agitated for 24 hours at 40° C.

The dispersion had the following composition:

| | |
|---|---|
| Sucrose | 64% |
| Glycerol | 22% |
| Water | 13.4% |
| Potassium Sorbate | 0.4% |
| Butylated Hydroxyanisole | 0.01% |

At the end of the period the meat pieces were removed, drained, dusted with sugar and heat sealed into Saran-coated polyethylene pouches under an atmosphere of nitrogen.

We claim:
1. A method of preserving undenatured proteinaceous material selected from the group consisting of raw animal tissue, raw meats, fish, meat offals and meat-like protein products, which method consists essentially in:

providing said material in an undenatured naturally moist condition;

treating said material when containing active enzymes to inhibit enzyme activity without cooking;

infusing into said material at a temperature within the range of −25° to +40° C sufficient edible water-soluble solute to impart a water activity in the range of 0.75 to 0.85 and stabilize the material against microbiological spoilage; and packing said material with said sufficient solute and in an undenatured condition substantially in the absence of oxygen thereby maintaining the natural raw meat appearance and texture of said material.

2. A method according to claim 1 wherein the infusion is carried out in aqueous solution at 15° to 40° C for a period of 4 to 6 hours.

3. A method according to claim 1 wherein said solution additionally contains a thickener, a colouring and a flavouring agent.

4. A method according to claim 1 wherein said material is sealed in a package of plastics material in an atmosphere substantially devoid of oxygen.

5. A method of making a proteinaceous sweetmeat for animals comprising the steps of:

providing undenatured naturally moist material selected from the group consisting of raw animal tissue, raw meats, fish, meat offals and meat-like protein products;

infusing into said material at a temperature within the range of −25° to +40° C sufficient edible water-soluble solute to impart a water activity in the range of 0.75 to 0.85 and stabilize the material against microbiological spoilage, said solute being predominantly a sugar;

draining said infused material and dusting the surface thereof with a solid sugar; and packing said dusted material substantially in the absence of oxygen thereby maintaining the natural raw meat appearance and texture of said material.

* * * * *

UNITED STATES PATENT OFFICE
CERTIFICATE OF CORRECTION

PATENT NO. : 4,001,445
DATED : January 4, 1977
INVENTOR(S) : Derek Horrocks et al.

It is certified that error appears in the above-identified patent and that said Letters Patent are hereby corrected as shown below:

Column 4, line 51, "Co" should be --CO--.

Signed and Sealed this

Twenty-eighth Day of June 1977

[SEAL]

Attest:

RUTH C. MASON
Attesting Officer

C. MARSHALL DANN
Commissioner of Patents and Trademarks